United States Patent [19]
Leavitt

[11] Patent Number: 5,958,817
[45] Date of Patent: Sep. 28, 1999

[54] ADSORBENT PRODUCTION WITH SINGLE PASS ION EXCHANGE

[75] Inventor: Frederick Wells Leavitt, Amherst, N.Y.

[73] Assignee: Praxair Technology, Inc., Danbury, Conn.

[21] Appl. No.: 08/847,530

[22] Filed: Apr. 24, 1997

Related U.S. Application Data

[63] Continuation of application No. 08/398,623, Mar. 2, 1995, abandoned.

[51] Int. Cl.$^6$ .................................................... B01J 29/06
[52] U.S. Cl. ........................... 502/64; 502/60; 502/79; 502/11
[58] Field of Search ................................ 502/60, 64, 79, 502/11, 439

[56] References Cited

U.S. PATENT DOCUMENTS

| | | | |
|---|---|---|---|
| 3,542,509 | 11/1970 | Fürtig et al. | 502/64 |
| 3,925,254 | 12/1975 | Oishi | 502/75 |
| 4,557,736 | 12/1985 | Sircar et al. | 55/62 |
| 5,126,056 | 6/1992 | Carlson | 210/676 |
| 5,152,813 | 10/1992 | Coe et al. | 55/26 |
| 5,174,979 | 12/1992 | Chao et al. | 423/715 |
| 5,419,891 | 5/1995 | Coe et al. | 423/700 |

FOREIGN PATENT DOCUMENTS

| | | |
|---|---|---|
| 239536 | 10/1986 | Germany . |
| 61-101412 | 5/1986 | Japan . |

OTHER PUBLICATIONS

Haas, "A New Apparatus for Continuous Countercurrent Flow of Solids and Liquids" Separation Science and Technology, 28(8), pp. 1579–1564, 1993. (no month).

Gomez–Vaillard et al, "Performance of Continuous Cyclic Ion–Exchange Reactors", Chem. Eng. Sci., v36, n2, 1981, pp. 307–317 (abstract) (no month) abstract only considered.

F. B. Martinola, Lewatit–WS–Process a Highly Reliable Counter–Current System for Ion Exchange and Adsorption, Int Water Conf., 39th Annu Meet, Proc. Pittsburgh, PA Oct. 31–Nov. 2, 1978 (abstract only considered).

Felder et al.; Elementry Principles of Chemical Processes, 1978 (no month) p. 106.

Primary Examiner—Michael Lewis
Assistant Examiner—Thomas G. Dunn, Jr.
Attorney, Agent, or Firm—Robert J. Follett

[57] ABSTRACT

An improved process for production of mixed cation-exchanged adsorbents that involves a single pass ion exchange. The precursor (non-exchanged) zeolite is treated with a combined essentially stoichiometric and excess solution of desirable weakly held and strongly held cations so that the resultant zeolite has the required mixed cation composition, while consuming smaller amounts of weakly held cation. Ion exchange post-treatment includes an optional equilibration step to ensure a uniform adsorbent and an optional washing step.

18 Claims, 1 Drawing Sheet

ADSORBENT PRODUCTION WITH SINGLE PASS ION EXCHANGE

This application is a Continuation of prior U.S. application Ser. No. 08/398,623, filing date Mar. 2, 1995, now abandoned.

BACKGROUND OF THE INVENTION

1. Field of the Invention

The present invention relates to a process for the production of cation-exchanged adsorbents. More particularly, the present invention relates to a single-step continuous ion exchange process for the production of cation-exchanged zeolite adsorbents.

2. Description of Related Art

Many techniques are known for making mixed-cation zeolites, such as calcium-lithium zeolites, by ion-exchange of existing sodium and/or potassium zeolites. At present, the processes for producing mixed cation zeolites require a complex and expensive sequence of successive ion-exchange steps in which ions present in the "raw" (i.e. untreated) zeolite are exchanged with other ions to produce a mixed cation zeolite product with the desired adsorbent properties. The prior art utilizes two basic methods for producing ion exchange materials containing mixed cations.

In a first method, the batches of raw (untreated) zeolite are exchanged with an aqueous solution containing the ions which are to be introduced into the product zeolite. The ion composition of the aqueous solution, which is referred to in the art as "brine", is adjusted to be in equilibrium with the ion concentration desired in the mixed-cation zeolite product.

In a second method, the slow and inefficient batch exchange steps are replaced with fast and continuous counterflow steps in which untreated zeolite is continuously countercurrently exchanged with a brine containing the mixed cations to be introduced into the product zeolite. The ion composition of the brine is again in equilibrium with the ion concentration desired in the mixed-cation zeolite product.

The prior art methods either require a multi-step procedure which utilizes extra equipment and is time consuming, or require large amounts of brine which wastes valuable cations. The prior art methods are illustrated in Chao U.S. Pat. No. 5,174,979 and Milton U.S. Pat. No. 2,882,244.

OBJECTS OF THE INVENTION

An object of the present invention is to provide a single step ion-exchange process for producing adsorbents, such as mixed cation zeolites, which does not suffer from, one or more of the drawbacks of the above prior art processes.

Another object of the present invention is to provide an ion exchange process which permits reduced amounts of expensive cations to be utilized and reduces the loss of valuable cations in the spent brine solutions.

Yet another object of the invention is to provide a process for making mixed cation-exchanged zeolites having an improved (more uniform) cation distribution compared to those provided by prior art processes.

Another object of the present invention is to provide an ion exchange process which reduces both costs and processing time compared to the processes of the prior art.

These and other objects will be apparent to those skilled in the art in light of the following description, claims, and drawings.

SUMMARY OF THE INVENTION

The process of the present invention removes one or more ions from an ion-exchangeable adsorbent material, such as a zeolite, and replaces these ions with two or more desired ions in a single, continuous countercurrent ion-exchange step. A "raw" zeolite in which substantially all of the ion-exchangeable sites are occupied by one or more undesirable cations is thus converted to a product zeolite in which two or more desired cations have replaced most or practically all the undesirable cations. This is accomplished by ion exchange in a continuous counterflow contactor using a feed brine containing the desired cations at predetermined concentrations wherein the ion composition of the brine is not in equilibrium with the-product zeolite. The brine contains essentially stoichiometric amounts of the more strongly held cation(s) whereas the least strongly held cation is provided at an excess sufficient to overcome the unfavorable equilibrium and mass transfer resistance with respect to that cation.

An equilibrating step (and process stage) may optionally be provided to insure uniform cation distribution in the product zeolite. In addition, a washing step may optionally be provided to wash the zeolite following the equilibrating step (or following the exchange step, if there is no equilibration).

DETAILED DESCRIPTION OF THE INVENTION

Figure 1:
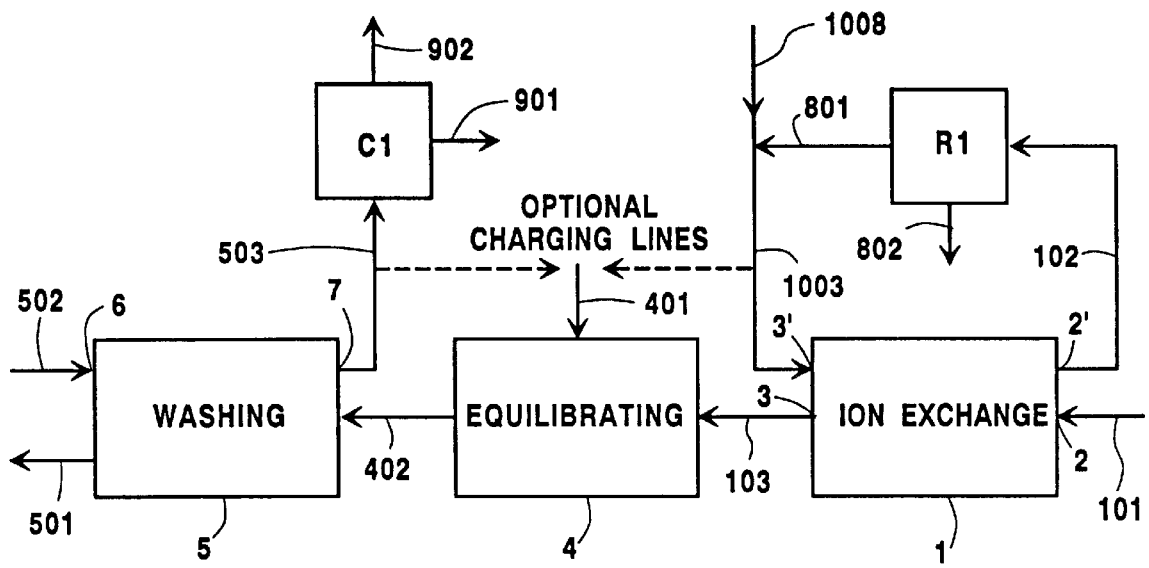
FIG. 1 is a flow chart illustrating the process of the present invention, including optional equilibrating and washing steps.

As shown in FIG. 1, the process of the present invention converts a raw adsorbent (101) containing one or more undesired cations to a product adsorbent (501) with any desired combination of cations. The present process uses single-step continuous counterflow ion-exchange (in Contactor 1) with a single aqueous feed brine composition (1003) containing calculated amounts of the desired mixed cations. The ion-exchanged adsorbent can be equilibrated (in Section 4) to provide a uniform distribution of cations therethrough, and the equilibrated adsorbent can be washed (in Section 5) to remove spent brine.

The ion exchange operation produces a tail brine (102) containing the original undesired cations and unused cations from the feed brine. An optional recovery unit, denoted as R1 in FIG. 1, may be used to recover some of the unused components notably expensive cations from the tail brine (102) for reuse (through stream 801) in the feed brine composition. Residual low cost salts (802) may be discarded or put to another use. An optional ion concentrator, Cl in FIG. 1, may be used to recover residual valuable salts (901) from the spent wash water (503). Wastewater (902) is discarded.

Each of the steps of the process of the present invention will be discussed in detail below.

A. Ion Exchange

As shown in FIG. 1, the first (and only ion-exchange) step of the process of the present invention involves ion-exchange of raw adsorbent 101 having an undesired cation or set of cations to convert it to a product adsorbent having a set of two or more desirable cations. This step takes place in a moving-bed counterflow contactor 1. The raw adsorbent (101) enters at the inlet 2 of the contactor 1, is transported through the contactor, and leaves through the outlet 3 of the contactor as ion-exchanged adsorbent 103.

An aqueous feed brine composition (1003) containing calculated amounts of at least one more strongly selected cation (e.g. Ca) and at least one less strongly selected cation (e.g. Li) to provide the desired mixed cations to be introduced into the raw adsorbent (101) enters the contactor at brine inset 3' countercurrently to the adsorbent (101). The feed brine flows through the contactor and comes in contact with the adsorbent stream, effecting ion exchange on the adsorbent. Following ion exchange, the brine (now depleted in desired cations) is removed from the adsorbent feed end of the contactor as the tail brine—(102) at brine outlet 2'.

The cations in the feed brine replace cations on the adsorbent by ion exchange at different rates depending on the affinity with which the adsorbent binds a particular ion. The most strongly selected cations (e.g. Ca) in the feed brine are quickly adsorbed into the adsorbent particles at or close to the point of introduction 3' of the feed brine (1003) If these more strongly selected cations are present at essentially stoichiometric amounts by the time the zeolite exits the contactor, the more strongly held cations will replace the correct proportion of less strongly selected cations (e.g. Li) so that the ion-exchanged adsorbent exiting the contactor at 3 will have the correct overall cation composition. ("Essentially stoichiometric" means an amount of a cation sufficient to satisfy the composition requirement of the desired zeolite plus to cover losses of that cation.) The feed brine having contacted the exiting adsorbent will be depleted of the more strongly selected cation relatively quickly within section 1 and will then contain substantially only the less strongly selected cation (e.g. Li, as well as the undesirable cation (e.g. Na)). By providing this less strongly held cation at a substantial excess over stoichiometry and equilibrium in the brine, relatively quick ion-exchange is achieved as the feed brine flows towards 2'. Typically, the key cation is provided in an amount such that the total equivalents of the cations added are within the range of about 4 to about 12 times the total capacity of the adsorbent to take them up, and preferably, from about 6 to about 9 times that amount. (It will be understood that if there are more than two desired cations, essentially stoichiometric amounts will still be used for the strongly held cation or cations, e.g., Ca and/or Mg and/or Sr. The less strongly held cation, e.g. Li, will be the one to be used in excess.) Thus, less strongly selected cations are bound onto the adsorbent in parts of the contactor that are farther from the brine inlet point 3'.

The least strongly selected cation type from the feed brine (e.g. Li) remains in solution as the brine flows through the contactor after all the other ions have been bound onto the adsorbent. The brine stream flowing towards brine outlet 2' now contains all of the least strongly selected cations that entered with the feed brine plus all ions displaced from the zeolite stream by the strongly selected cations originally in the feed brine. In the portion of the contactor nearer the adsorbent inlet 2, the least strongly selected cations eventually replace the undesirable cations that are found in the raw adsorbent.

Most of the excess amount of the least strongly selected cation type (except for entrainment losses) will remain in the brine flow and will appear in the tail brine (102) along with the cation types that were displaced from the raw adsorbent. If the least strongly selected cation type is valuable, as is the case with lithium, a substantial portion of it may be recovered and then reused by adding it to feed brine. In FIG. 1 undesirable ions (e.g. sodium) are removed from the tail brine in recovery unit R1 and recovered feed brine (801) is returned to the feed. Cation recovery can be accomplished by any means, e.g. fractional crystallization or preferably the method described in copending commonly assigned U.S. patent application Ser. No. 08/172,297, filed Dec. 23, 1993.

The ability to recover less strongly held cations (e.g Li) economically is one of the advantages of the present invention. Tail brines of processes according to the invention are depleted in more strongly held cations (e.g. Ca, Sr, Mg) the presence of which interferes with the ability to recover the less strongly held cations, especially by fractional crystallization. For example, if a tail brine contains relatively large amounts of calcium (along with sodium or potassium either or both of which are typically the ions removed from the raw adsorbent) it is difficult to precipitate these ions without also causing precipitation of lithium chloride which is the object of the recovery process.

In general, the feed brine must supply a sufficient number of cations of each type to ensure that the product adsorbent will have the desired ion composition. This calculation is well within the skill in the art.

There must also be sufficient total cations in the feed brine to displace the undesirable cations present in the raw adsorbent. In the present invention, it is first assumed that the least strongly held cation ("key cation") is the only cation in the feed brine and would be displacing all the undesirable cations that are to be displaced. The number of equivalents of the key cation that would be needed to displace the undesirable cation (s) are then calculated, and excess allowances are made for the loading selectivity of the key cation, mass transfer resistance and unfavorable equilibrium and for limiting the size of the equipment (this is a trade off), and entrainment losses (i.e. amount of nonadsorbed key cation that would be taken out of the system with the ion-exchanged adsorbent). A multiple of the stoichiometric amount is then arrived at. This number is then used for all of the actual cations in the feed brine. The more strongly held cation would then be used in an amount essentially sufficient to satisfy stoichiometry of the predetermined (target) exchanged adsorbent composition (allowing for a small loss, since only a relatively insignificant quantity of the strongly held cation would be not adsorbed but would be "lost" in the crystal or in the pores of the adsorbent or in the interparticulate space of the adsorbent exiting the ion-exchange step).

Thus, it is an advantage of the present invention that the excess needed over stoichiometry of the key cation is reduced by an essentially stoichiometric amount of the strongly held cations.

Within the foregoing considerations, the excess over stoichiometry of the key cation varies on a case-by-case basis. The excess can also vary depending on the ion-exchange efficiency and size of the contactor and the relative selectivity of the adsorbent for the key cation. All of these are design considerations which can be readily taken into account by those skilled in the art, in light of the present disclosure.

What is important is the realization by the present inventor that the strongly held cation(s) in the feed brine need to be used in essentially stoichiometric amounts. This makes it possible to reduce the amount of the strongly held cation(s) in the feed brine, and avoid contaminating the tail brine with the strongly held cation(s). This permits use of the key cation in a relatively large excess without wasting key cation because it can then be recovered in a recovery section.

Another realization by the present inventor is that the excess of the key cation in the feed brine can be reduced by the (essentially stoichiometric) amount(s) of the more strongly held cation(s), thus effecting a saving in key cation without compromising the overall efficiency of the ion-exchange process. This saving is in addition to any recovery of the key cation in the recovery section.

Many ion-exchanged adsorbent products (i.e. products containing various exchanged ions or ion combinations) may be made by the process of the present invention. In each case, the total amount of the cations used in the feed brine is first calculated to be equal to the amount of the key cation that would be necessary to ensure removal of the raw adsorbent's undesirable cations if the key cation were the only one to be exchanged. Then the amounts of the other feed brine cation types are adjusted to ensure that there will be just enough (stoichiometric amount plus losses) of each in the product adsorbent. The difference between the total amount of cations calculated and the sum of the essentially stoichiometric amounts of the nonkey cations is the amount of the key cation used (which is thus used at a substantial excess).

The amount of adsorbable ions added to the feed brine may also be affected by the pH of the brine solution, which may be adjusted as necessary to prevent precipitation of ion salts and provide optimum ion diffusion conditions. For example, a lower pH is used to avoid precipitation of carbonates (e.g. calcium, magnesium or lithium carbonate); a higher pH is used to avoid precipitation of silicates, as needed and as is well-known in the art.

The process of the invention can be used to prepare any cation-exchanged material, including zeolite type X, other zeolites (such as zeolite A, zeolite Y, mordenite, clinoptilolite, erionite, etc. without limitation), ion-exchange resins, or other materials. The cations used to make a mixed cation zeolite product include without limitation lithium, calcium, magnesium, strontium, barium, silver, copper, and others. The process is typically utilized to make X zeolites with mixtures of cations, such as calcium-lithium or calcium-magnesium-lithium (containing from 5 to 95% lithium and preferably from 50 to 95% lithium the percentage being based on the exchangeable ion content). The nonexchanged adsorbent can contain alkali metal ions usually sodium or potassium or a combination thereof. It is preferred that the exchanged adsorbent not contain more than 3% of the undesirable ion(s).

The process of the invention could also be used to make mixed anion-exchanged material by using a feed brine with a calculated mixture of salts having the desired anions, using the same principles and design considerations outlined above with such modifications as will be readily apparent to those skilled in the art. Additionally, those skilled in the art will use information on anion exchange equilibrium, anion diffusivities and anion mass transfer rates, which can be found from the published literature and/or determined by well-known methods.

The invention can be used with any continuous counterflow contactor suitable for liquid-solid contact, and preferably equipped with mixing means to achieve thorough mixing. Some examples are: trayed moving-bed contactors such as used in the Bureau of Mines process for uranium recovery, true plug-flow moving beds, horizontal contactors using screw conveyors to transport the solids, contactors equipped with mixing blades and some simulated moving beds. Such equipment has been disclosed, e.g., in Haas, P. A. *Separat. Sci. & Tech.* 28:1579–1594, 1993.

The invention can be used with or without recovery of the cations (or anions) and with or without equilibrating.

B. Equilibrating

As a result of the great affinity of the raw adsorbent for the more strongly held ions, such as calcium, the adsorbent product leaving the contactor may require equilibration in the equilibrating section 4 shown in FIG. 1. Where the feed brine (1003) enters the contactor (at 3') and contacts the adsorbent, there is a very rapid ion-exchange rate for the more strongly held ions. When the adsorbent is in the form of beads or other relatively large particles, the outer shells of the particles quickly adsorb up nearly all the more strongly held ions. The particles hold nearly all of the adsorbed ions near their surfaces, and comparatively few tightly held ions reach the particle cores. Also, some particles may adsorb an excess of the more strongly held ions, leaving others with less. If the adsorbent particles recovered from the outlet of the contactor are immediately washed with water or with a very dilute brine, then diffusion of the ions is slowed and may be nearly halted.

To ensure not only that the ions diffuse through the entire volume of the particles, but also that they are equally distributed among the particles, an equilibrating section 4 can be provided downstream from the contactor and before the washing section 5, as shown in FIG. 1. Following continued contact of 35 the ion-exchanged adsorbent particles (103) with additional brine in the equilibrating section 4, the particles equilibrate as the ions diffuse throughout each particle.

In the equilibrating section 4 the adsorbent particles (103) are maintained in stationary contact with an equilibrating solution. The equilibrating solution is not flowed through the equilibrating section, but merely allowed to remain in immediate contact with the particles passing through. The equilibrating solution may originally consist of water or a strong brine (e.g. a brine having the same composition as the feed brine) (see dotted line and stream 401 in FIG. 1) containing the ions to be diffused into the particles; after the equilibrating operation begins, the liquid in the equilibrating section will equilibrate with the entering ion-exchanged adsorbent particles. It is preferred that the equilibrating solution not be disturbed during the equilibration step (e.g. it is preferred that no water or extra brine be added in this stage) and it is important that the equilibrating solution contain no ions other than the feed brine (although it may contain a stronger brine than the feed brine). The equilibrating solution may be heated to e.g. 90° C. to expedite the equilibration.

The equilibration time may vary widely, and depends on such system variables as the diffusion rate of the ions from the feed brine composition into the adsorbent particles, the diffusion rate of the ions from the adsorbent into the feed brine, and the degree of mixing of the ions with the adsorbent in the contactor. The equilibration time also depends on the size and porosity of the adsorbent particles. Finally, the equilibration time depends on how nearly uniform an ion concentration is desired in the adsorbent particles, and the particles must remain in contact with the equilibrating solution for a sufficient time to achieve this ion concentration level. For example, if sufficient mixing occurs in the contactor, all of the adsorbent particles are equally exposed to the ions in the feed brine composition, and equilibration is only needed to allow the ions, particularly the more strongly held cations, to diffuse farther into the particles. Where there is poor mixing in the contactor, more time is needed to ensure that different particles receive nearly the same proportions of the ions.

In general, equilibration time is approximately proportional to the square of the particle size and approximately inversely proportional to the diffusivities of the ions involved. Equilibration time is typically within the range of about 1 to about 6 hours for most mixed cation zeolites made by the process of the invention.

For example, to achieve essentially homogeneous diffusion of calcium and lithium ions in 8×12 (standard screen size) zeolite X beads (containing 90% Li and 9% Ca) at temperatures near 100° C., at least about two hours of equilibration time should be used, and five hours of equilibration are preferred to further improve the evenness of the ion distribution. More time is needed for lower temperatures or for equilibration brines with lower ion concentrations. Ionic diffusivities in the adsorbent can be estimated from ionic diffusivities in solution by multiplying with particle porosity and dividing by particle tortuosity. Tortuosity is the ratio of average actual diffusion path length to the theoretical minimum diffusion path length. For spherical particles the minimum length diffusion paths would lie along the particle radii. Actual diffusion paths would curve and twist and so would have longer lengths.

The equilibrated zeolite 402 may optionally be washed as illustrated in FIG. 1 and described below.

C. Washing Section

The washing step of the process of the present invention, which in the system illustrated in FIG. 1 is conducted in the washing section 5, removes unwanted salts from the (optionally equilibrated) adsorbent. Wash water (502) enters the outlet 6 of the washing section and spent wash water leaves at the inlet 7.

Figure 2:
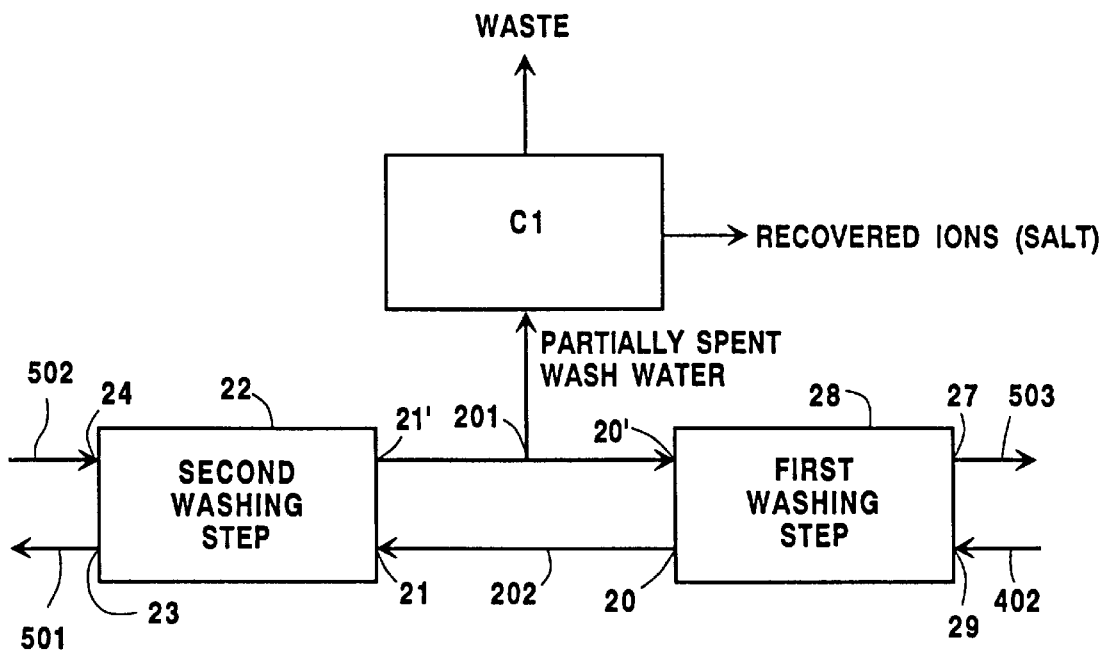
FIG. 2 is a flow chart illustrating the washing step of the present invention.

The washing section may optionally be set up as a 2-stage wash as shown in FIG. 2. The equilibrated zeolite (402) (from equilibrating section 4 in FIG. 1) enters the inlet 29 of the first washing stage 8, where it is washed with partially spent washwater 201 entering through inlet 201 from the second wash stage 22 to remove the bulk of the dissolved salts. The partially washed adsorbent 202 leaves first washing stage 28 through outlet 20 and passes into the inlet 21 of the second washing stage 22 where it is final-washed with fresh wash water 502 to remove the last of the dissolved salts. The fully washed adsorbent 501 then leaves the second washing section 22 through outlet 23 as the product adsorbent.

A strong flow (e.g., about 10 to about 100 times the amount of liquid entrained in the adsorbent material) of fresh wash water, passes through inlet 24 into the second washing section 22 to thoroughly wash salts from the zeolite. Partially spent wash water stream 201 exiting through outlet 21' from the second washing section 22 therefore contains a small amount of ion salts, such as calcium chloride or lithium chloride (e.g. about 1/10 to about 1/100 of the feed brine concentrations of these ions). A portion of the spent wash water stream 111 from the second washing section may be discarded or subjected to ion concentration (e.g. by evaporation of the water or precipitation of the salts) in concentration stage Cl to recover any valuable ions.

A slow flow (e.g. about 1 to about 1.5 times the amount of liquid entrained in the adsorbent material which in turn includes liquid contained within the adsorbent crystals, and within the particle pores and interparticular voids) of wash water stream 201 passes through the first washing section 28 to lightly wash the bulk of the salts from the adsorbent without diluting them much. Spent wash water 503 exiting through outlet 27 from the first washing section 28 contains residual ion salts, and the total salt concentration is as high or nearly as high (e.g. 60–100%) as that of the feed brine to the contactor. The spent wash water 7 from the first washing section may optionally be mixed into the feed brine for the contactor to save valuable salts.

The invention is further illustrated below by specific working examples which are not intended to limit the scope of the invention.

EXAMPLES

Example 1

In this example a mixed cation lithium-containing X zeolite containing lithium and calcium at an equivalent ratio of 85:15 (and no more than 5% sodium, typically 1–3% sodium) is prepared. A sodium X zeolite would need to be treated with a feed brine with a total salt concentration of 1.7 equivalents/liter maintained at about 100° C. if stoichiometric amounts of both cations were to be used.

Sodium and calcium are each more strongly selected than lithium. Sodium is about five times more strongly selected than lithium; therefore, if no calcium is present in the feed brine composition, an amount of lithium chloride of at least five times the stoichiometric ion-exchange amount would be required to overcome the unfavorable lithium-to-sodium exchange. (The stoichiometric amount referred to in the preceding sentence is the amount needed to exactly replace every untreated zeolite cation with a lithium ion as if the zeolite was to be 100% ionexchanged with lithium.) Preferably, about eight times the stoichiometric amount of the less strongly adsorbed ion would be normally utilized to ensure good exchange of lithium for sodium in a contactot of practical size to make a single-cation (specifically lithium) exchanged zeolite.

In the case of the present invention wherein a mixed cation zeolite is produced, eight equivalents of total (not lithium) salt per equivalent of zeolite or 8/1.7=4.7 liters of total feed brine per equivalent of zeolite are required. In 35 other words, the excess of lithium needed to produce the mixed Li/Ca cation exchanged zeolite is reduced by the amounts of other cations used, and this provides the present invention with a significant advantage by reducing the amount of lithium in the system. This total ion amount includes sufficient lithium to ensure that there will be sufficient lithium ions in the right locations in the contactor to drive off nearly all the sodium cations and replace them with lithium cations. This replacement occurs in the part of the contactor closer to the zeolite inlet (2 in FIG. 1).

Calcium ions are also added in the feed brine composition to provide the desired amount in the product zeolite (stoichiometric amount) and to allow for expected loss. Some calcium ions fail to enter the zeolite and are lost in the tail brine; however, this loss of calcium ions is very small, since the zeolite strongly selects calcium compared to lithium. Nearly all of the calcium ions rapidly replace lithium in the stream of zeolite near the zeolite outlet (3 in FIG. 1) from the contactor. The desorbed lithium is carried by the brine stream flowing countercurrently through the contactor and thus is available to help displace sodium cations from the raw zeolite.

As only enough calcium chloride is required in the feed brine composition to match the amount needed in the product zeolite, the amount needed is: 0.15 equivalents of calcium per equivalent of zeolite or, 0.15/8=0.01875 equivalents of calcium per equivalent of total salt in the brine.

The essentially stoichiometric calcium chloride concentration is thus:

1.7(total salt equivalents/liter)×(0.01875 $Ca^{++}$ equivalents per total salt equivalent)=0.032 calcium equivalents/liter, and the lithium chloride concentration is 1.7−0.032=1.668 equivalents/liter.

This concentration of calcium chloride is far above the equilibrium level for the desired 15% calcium-exchanged zeolite X. The equilibrium equivalent fraction would have been less than about 0.00005 instead of 0.01875. (These fractions are calculated based on published equilibrium values. If the solution were multicomponent, then they would be estimated based on published one-component and two-component equilibria, as is well known.) If that equilibrium calcium concentration were used in the feed brine, then far more feed brine and far more lithium chloride would be required to achieve acceptable levels of ion exchange. Thus, unexpectedly, the present invention wastes less lithium chloride by using an excess of both lithium and calcium over equilibrium in the feed brine.

The contactor requires only the same amount of feed brine having a composition providing as many total ions as the amount of lithium ions that would be needed just to convert the raw zeolite to the lithium-exchanged form, because the calcium ions from the feed brine composition displace an equivalent amount of lithium ions from the zeolite, and those displaced ions become immediately available to help displace sodium ions upstream. Thus, the present invention replaces some of the lithium ions in the feed brine by less expensive calcium ions. As a result, the feed brine composition uses a smaller amount of the expensive lithium chloride; the balance is made up of the much less expensive calcium chloride.

The pH of the feed brine may be adjusted to prevent precipitation of calcium as calcium hydroxide. At 100° C. the solubility of calcium hydroxide is $1.0 \times 10^{-2}$ mol/liter, or $2.0 \times 10^{-2}$ calcium equivalents/liter. To avoid precipitation of calcium equivalents per liter, the pH should be adjusted slightly downward. Lowering the pH from 7 to 6.5 would increase the limiting calcium concentration by a factor of about 10; that would dissolve calcium to a concentration of about 0.20, well over the actual level.

The tail brine contains all the displaced sodium cations as sodium chloride. It also contains all the excess lithium-ions as lithium chloride. The sodium chloride in the tail brine can be selectively precipitated out in the optional tail brine recovery plant, shown as Rl in FIG. 1. Then, the recovered tail brine can be mixed with makeup lithium chloride and calcium chlorides (stream 1008 in FIG. 1) and reused as new feed brine fed to the outlet of the contactor. The operation again uses makeup calcium chloride to replace some makeup lithium chloride, consistent with the above calculation of the amount of calcium and lithium chloride needed. Otherwise, recovery and recycling operate as if the ion-exchange section were merely converting the raw zeolite to the lithium-exchanged form.

Example 2

The raw zeolite in this Example contains both potassium and sodium cations (1–70% K) instead of just the sodium cations of the zeolite utilized in Example 1. The potassium cations are typically more strongly held than sodium cations by the zeolite so that more of the lithium cation is needed to remove them (if all of the cations were to be replaced by lithium cations). For example, about 16 times the stoichiometric amount of lithium may be needed instead of only eight (in Ex. 1), so either more feed brine (double the amount used in Ex. 1) or a higher concentration of the less strongly held cation in the brine must be used.

To prepare a product zeolite with 15 equivalent percent calcium and 85 equivalent percent lithium: 16 equivalents of total salt per equivalent is needed, i.e. 9.4 liters of brine per equivalent of zeolite (since the total brine has 1.7 equivalents of total salt per liter).

As the feed brine must supply only enough calcium chloride to match the amount needed in the product zeolite, the amount needed is:

0.15 $Ca^{++}$ equivalents per zeolite equivalent of zeolite, divided by 16 (the total lithium required by the presence of $K^+$ ions). The resulting amount is 0.00938 equivalents of calcium per equivalent of total salt in the brine. The calcium chloride concentration is thus 1.7 (total salt equivalents per liter)×(0.00938 $Ca^{++}$ equivalents per total salt equivalent)= 0.016 equivalents/liter. The lithium chloride concentration is 1.7−0.016=1.684 equivalents/liter.

Example 3

If the product zeolite is to have cation types with the following equivalent percentages: 12% magnesium, 3% calcium, and 85% lithium, then the same lithium amount is still needed in the feed brine composition, since both magnesium and calcium are able to displace lithium from the adsorbent.

If eight equivalents of lithium cations are required per zeolite equivalent, the amounts of the magnesium and calcium cations needed are:

1) Mg: 0.12 equivalents of magnesium per equivalent of zeolite or, 0.12/8=0.015 equivalents of magnesium per equivalent of total salt in the brine.

2) Ca: 0.03 equivalents of calcium per equivalent of zeolite or, 0.03/8=0.00375 equivalents of calcium per equivalent of total salt in the brine.

Although specific preferred embodiments of the present invention have been described above, those skilled in the art will appreciate that many additions omissions and modifications are possible all within the scope of the claims that follow:

I claim:

1. A process for producing a mixed cation exchanged adsorbent having a selected cation composition from a non-exchanged adsorbent containing at least one first ion to be exchanged by substantially displacing said at least one first ion to be exchanged with: (i) at least one second cation which is held more weakly by said adsorbent than said first ion; and (ii) at least one third cation which is held more strongly by said adsorbent than said first ion, the process comprising a single, continuous ion-exchange stage comprising:

concurrently contacting an adsorbent stream comprising said non-exchanged adsorbent with an aqueous brine stream containing an essentially stoichiometric amount of said at least one third cation said stoichiometric amount being measured with respect to the stoichiometric amount in said selected composition and an excess over stoichiometric amount of said at least one second cation, said stoichiometric amount being measured with respect to the stoichiometric amount in said selected composition, said amounts in combination being sufficient to displace said at least one first ion from said non-exchanged adsorbent, yielding a mixed cation exchanged adsorbent having said selected cation composition; and equilibrating said cation-exchanged adsorbent by contacting said cation-exchanged adsorbent with an aqueous equilibrating solution comprising said second and third cations for a time sufficient to ensure even distribution of said cations in the mixed cation-exchanged adsorbent, thereby yielding an equilibrated mixed cation-exchanged adsorbent.

2. A process according to claim 1, wherein the second cation is at least one selected from the group consisting of calcium, magnesium, and strontium.

3. A process according to claim 1, wherein the first cation is lithium.

4. A process according to claim 1, further comprising washing said mixed cation exchanged adsorbent.

5. A process according to claim 1, further comprising washing said equilibrated adsorbent.

6. The process of claim 1 wherein said adsorbent is zeolite.

7. The process of claim 1 wherein said first cation is selected from the group consisting of sodium, potassium and combinations thereof; said second cation is lithium and said third cation is selected from the group consisting of calcium, magnesium, strontium and combinations of at least two thereof.

8. The process of claim 7 wherein said ion-exchanged adsorbent contains no more than 5% sodium.

9. The process of claim 8 wherein the exchanged ion content of said mixed cation exchanged adsorbent is between 5 and 95% lithium, the balance being calcium.

10. The process of claim 9 wherein said content is between 50 and 95% lithium.

11. The process of claim 10 wherein said content is between 50 and 85% lithium.

12. A process for producing a mixed cation-exchanged zeolite product having a selected composition, which comprises the following steps:

(a) introducing a non-exchanged zeolite containing at least one first cation into an inlet of a contactor to provide a zeolite stream in said contactor;

(b) introducing an aqueous feed composition into an outlet of said contactor to move in a substantially countercurrent direction to said zeolite stream, wherein said feed composition comprises an essentially stoichiometric amount of at least one third cation which is held more strongly by said adsorbent than said first cation, said stoichiometric amount being measured with respect to the stoichiometric amount in said selected composition, and an excess over stoichiometric amount of at least one second cation which is held more weakly by said adsorbent than said first cation, said stoichiometric amount being measured with respect to the stoichiometric amount in said selected composition, said amounts in combination being sufficient to displace said first ions on said non-exchanged zeolite with said at least one of said second cations and said at least one of said third cation, yielding an ion exchanged zeolite of said selected mixed cation composition;

(c) recovering said mixed cation-exchanged zeolite from the outlet of said contactor; and (d) equilibrating said mixed cation-exchanged zeolite in an aqueous equilibrating solution for a time sufficient to ensure even distribution of the mixed cations on said exchanged zeolite, and thereby producing an equilibrated mixed cation-exchanged zeolite.

13. The process of claim 12 further comprising the step:

(e) washing said equilibrated zeolite to produce a washed mixed cation-exchanged zeolite product.

14. The process of claim 13 further comprising the step:

(f) recovering a tail brine from the inlet of said contactor, and separating said second cation from said tail brine.

15. A process according to claim 13, wherein said washing step (e) comprises contacting said equilibrated zeolite with water in a first wash to produce a partially washed zeolite and concentrated wash solution, followed by a second wash wherein said partially washed zeolite is contacted with additional water to produce a dilute wash solution and said ion-exchanged zeolite product.

16. A process according to claim 15, further comprising adding a portion of said concentrated wash solution into said aqueous feed composition.

17. An adsorbent material comprising a zeolite X material between 5–95% lithium cations, less than 3% of at least one of sodium or potassium cations, and the balance of cations being selected from the group consisting of: calcium, magnesium, strontium, barium, silver and copper;

wherein said cations are distributed homogeneously throughout the adsorbent.

18. An mixed cation adsorbent material comprising a zeolite X material having a selected composition between 5–95% lithium cations, less than 3% of at least one of sodium or potassium cations, and the balance of cations being selected from the group consisting of: calcium, magnesium, strontium, barium, silver and copper;

wherein said cations are distributed homogeneously throughout the adsorbent; said adsorbent being produced by a single, continuous ion-exchange stage process comprising:

a) providing a non-exchanged adsorbent containing at least one of sodium or potassium ion to be exchanged by substantially displacing said at least one of sodium or potassium with lithium and at least one cation selected from the group consisting of calcium, magnesium, strontium, barium, silver and copper b) concurrently contacting an adsorbent stream comprising said non-exchanged adsorbent with an aqueous brine stream containing an essentially stoichiometric amount of said at least one cation selected from the group consisting of calcium, magnesium, strontium, barium, silver and copper cation said stoichiometric amount being measured with respect to the stoichiometric amount in said selected composition and an excess over stoichiometric amount of said lithium, said stoichiometric amount being measured with respect to the stoichiometric amount in said selected composition, said amounts in combination being sufficient to displace said at least one of said sodium or potassium ions from said non-exchanged adsorbent, yielding a mixed cation exchanged adsorbent having said selected cation composition; and then c) equilibrating said cation-exchanged adsorbent by contacting said mixed cation exchanged adsorbent with an aqueous equilibrating solution comprising said lithium, calcium, magnesium, strontium, barium, silver and copper cations for a time sufficient to ensure even distribution of said cations in the mixed cation-exchanged adsorbent, thereby yielding a mixed cation exchanged adsorbent wherein said cations are distributed homogeneously throughout the adsorbent.

* * * * *